(12) United States Patent
Baruch et al.

(10) Patent No.: US 10,235,060 B1
(45) Date of Patent: Mar. 19, 2019

(54) MULTILEVEL SNAPSHOT REPLICATION FOR HOT AND COLD REGIONS OF A STORAGE SYSTEM

(71) Applicant: EMC IP Holding Company, LLC, Hopkinton, MA (US)

(72) Inventors: Leehod Baruch, Rishon Leziyon (IL); Assaf Natanzon, Tel Aviv (IL); Philip Shilane, Newtown, PA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 125 days.

(21) Appl. No.: 15/275,677

(22) Filed: Sep. 26, 2016

Related U.S. Application Data

(60) Provisional application No. 62/322,642, filed on Apr. 14, 2016.

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |

(52) U.S. Cl.
CPC ............ *G06F 3/0619* (2013.01); *G06F 3/065* (2013.01); *G06F 3/067* (2013.01); *G06F 3/0665* (2013.01)

(58) Field of Classification Search
CPC ................................. G06F 3/065; G06F 3/0665
USPC ........................................................ 711/162
See application file for complete search history.

(56) References Cited

U.S. PATENT DOCUMENTS

| | | |
|---|---|---|
| 5,170,480 A | 12/1992 | Mohan et al. |
| 5,249,053 A | 9/1993 | Jain |
| 5,388,254 A | 2/1995 | Betz et al. |
| 5,499,367 A | 3/1996 | Bamford et al. |
| 5,526,397 A | 6/1996 | Lohman |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

U.S. Appl. No. 15/274,362, filed Sep. 23, 2016, Baruch et al.

(Continued)

*Primary Examiner* — Edward J Dudek, Jr.
*Assistant Examiner* — Sidney Li
(74) *Attorney, Agent, or Firm* — Daly, Crowley Mofford & Durkee, LLP

(57) ABSTRACT

Described embodiments provide systems and methods for operating a storage system having a production volume. The system identifies one or more regions of the production volume and receives write requests to be written to the production volume during an operating time window. Each received write request is associated with at least one of the regions. Based upon at least one the received write requests, one or more regions of the production volume are identified as hotspot regions and one or more regions of the production volume are identified as cold regions. For write requests associated with a hotspot region, snapshot replication is performed at a hotspot region snapshot interval, and for write requests associated with a cold region, snapshot replication is performed at one or more cold region snapshot intervals. The hotspot region snapshot interval is longer than the one or more cold region snapshot intervals.

14 Claims, 7 Drawing Sheets

(56) References Cited

U.S. PATENT DOCUMENTS

| | | | |
|---|---|---|---|
| 5,864,837 | A | 1/1999 | Maimone |
| 5,879,459 | A | 3/1999 | Gadgil et al. |
| 5,990,899 | A | 11/1999 | Whitten |
| 6,042,652 | A | 3/2000 | Hyun et al. |
| 6,065,018 | A | 5/2000 | Beier et al. |
| 6,143,659 | A | 11/2000 | Leem |
| 6,148,340 | A | 11/2000 | Bittinger et al. |
| 6,174,377 | B1 | 1/2001 | Doering et al. |
| 6,174,809 | B1 | 1/2001 | Kang et al. |
| 6,203,613 | B1 | 3/2001 | Gates et al. |
| 6,260,125 | B1 | 7/2001 | McDowell |
| 6,270,572 | B1 | 8/2001 | Kim et al. |
| 6,272,534 | B1 | 8/2001 | Guha |
| 6,287,965 | B1 | 9/2001 | Kang et al. |
| 6,467,023 | B1 | 10/2002 | DeKoning et al. |
| 6,574,657 | B1 | 6/2003 | Dickinson |
| 6,621,493 | B1 | 9/2003 | Whitten |
| 6,804,676 | B1 | 10/2004 | Bains, II |
| 6,947,198 | B2 | 9/2005 | Lubbers et al. |
| 7,043,610 | B2 | 5/2006 | Horn et al. |
| 7,051,126 | B1 | 5/2006 | Franklin |
| 7,076,620 | B2 | 7/2006 | Takeda et al. |
| 7,111,197 | B2 | 9/2006 | Kingsbury et al. |
| 7,117,327 | B2 | 10/2006 | Hirakawa et al. |
| 7,120,768 | B2 | 10/2006 | Mizuno et al. |
| 7,130,975 | B2 | 10/2006 | Suishu et al. |
| 7,139,927 | B2 | 11/2006 | Park et al. |
| 7,159,088 | B2 | 1/2007 | Hirakawa et al. |
| 7,167,963 | B2 | 1/2007 | Hirakawa et al. |
| 7,203,741 | B2 | 4/2007 | Marco et al. |
| 7,222,136 | B1 | 5/2007 | Brown et al. |
| 7,296,008 | B2 | 11/2007 | Passerini et al. |
| 7,328,373 | B2 | 2/2008 | Kawamura et al. |
| 7,353,335 | B2 | 4/2008 | Kawamura |
| 7,360,113 | B2 | 4/2008 | Anderson et al. |
| 7,426,618 | B2 | 9/2008 | Vu et al. |
| 7,519,625 | B2 | 4/2009 | Honami et al. |
| 7,519,628 | B1 | 4/2009 | Leverett |
| 7,546,485 | B2 | 6/2009 | Cochran et al. |
| 7,590,887 | B2 | 9/2009 | Kano |
| 7,606,940 | B2 | 10/2009 | Yamagami |
| 7,719,443 | B1 | 5/2010 | Natazon |
| 7,757,057 | B2 | 7/2010 | Sangapu et al. |
| 7,840,536 | B1 | 11/2010 | Ahal et al. |
| 7,840,662 | B1 | 11/2010 | Natanzon |
| 7,844,856 | B1 | 11/2010 | Ahal et al. |
| 7,860,836 | B1 | 12/2010 | Natanzon et al. |
| 7,882,286 | B1 | 2/2011 | Natanzon et al. |
| 7,934,262 | B1 | 4/2011 | Natanzon et al. |
| 7,958,372 | B1 | 6/2011 | Natanzon |
| 8,037,162 | B2 | 10/2011 | Marco et al. |
| 8,041,940 | B1 | 10/2011 | Natanzon et al. |
| 8,060,713 | B1 | 11/2011 | Natanzon |
| 8,060,714 | B1 | 11/2011 | Natanzon |
| 8,103,937 | B1 | 1/2012 | Natanzon et al. |
| 8,108,634 | B1 | 1/2012 | Natanzon et al. |
| 8,205,009 | B2 | 6/2012 | Heller et al. |
| 8,214,612 | B1 | 7/2012 | Natanzon |
| 8,250,149 | B2 | 8/2012 | Marco et al. |
| 8,271,441 | B1 | 9/2012 | Natanzon et al. |
| 8,271,447 | B1 | 9/2012 | Natanzon et al. |
| 8,332,687 | B1 | 12/2012 | Natanzon et al. |
| 8,335,761 | B1 | 12/2012 | Natanzon |
| 8,335,771 | B1 | 12/2012 | Natanzon et al. |
| 8,341,115 | B1 | 12/2012 | Natanzon et al. |
| 8,370,648 | B1 | 2/2013 | Natanzon |
| 8,380,885 | B1 | 2/2013 | Natanzon |
| 8,392,680 | B1 | 3/2013 | Natanzon et al. |
| 8,429,362 | B1 | 4/2013 | Natanzon et al. |
| 8,433,869 | B1 | 4/2013 | Natanzon et al. |
| 8,438,135 | B1 | 5/2013 | Natanzon et al. |
| 8,464,101 | B1 | 6/2013 | Natanzon et al. |
| 8,478,955 | B1 | 7/2013 | Natanzon et al. |
| 8,495,304 | B1 | 7/2013 | Natanzon et al. |
| 8,510,279 | B1 | 8/2013 | Natanzon et al. |
| 8,521,691 | B1 | 8/2013 | Natanzon |
| 8,521,694 | B1 | 8/2013 | Natanzon |
| 8,543,609 | B1 | 9/2013 | Natanzon |
| 8,583,885 | B1 | 11/2013 | Natanzon |
| 8,600,945 | B1 | 12/2013 | Natanzon et al. |
| 8,601,085 | B1 | 12/2013 | Ives et al. |
| 8,627,012 | B1 | 1/2014 | Derbeko et al. |
| 8,683,592 | B1 | 3/2014 | Dotan et al. |
| 8,694,700 | B1 | 4/2014 | Natanzon et al. |
| 8,706,700 | B1 | 4/2014 | Natanzon et al. |
| 8,712,962 | B1 | 4/2014 | Natanzon et al. |
| 8,719,497 | B1 | 5/2014 | Don et al. |
| 8,725,691 | B1 | 5/2014 | Natanzon |
| 8,725,692 | B1 | 5/2014 | Natanzon et al. |
| 8,726,066 | B1 | 5/2014 | Natanzon et al. |
| 8,738,813 | B1 | 5/2014 | Natanzon et al. |
| 8,745,004 | B1 | 6/2014 | Natanzon et al. |
| 8,751,828 | B1 | 6/2014 | Raizen et al. |
| 8,769,336 | B1 | 7/2014 | Natanzon et al. |
| 8,805,786 | B1 | 8/2014 | Natanzon |
| 8,806,161 | B1 | 8/2014 | Natanzon |
| 8,825,848 | B1 | 9/2014 | Dotan et al. |
| 8,832,399 | B1 | 9/2014 | Natanzon et al. |
| 8,850,143 | B1 | 9/2014 | Natanzon |
| 8,850,144 | B1 | 9/2014 | Natanzon et al. |
| 8,862,546 | B1 | 10/2014 | Natanzon et al. |
| 8,892,835 | B1 | 11/2014 | Natanzon et al. |
| 8,898,112 | B1 | 11/2014 | Natanzon et al. |
| 8,898,409 | B1 | 11/2014 | Natanzon et al. |
| 8,898,515 | B1 | 11/2014 | Natanzon |
| 8,898,519 | B1 | 11/2014 | Natanzon et al. |
| 8,914,595 | B1 | 12/2014 | Natanzon |
| 8,924,668 | B1 | 12/2014 | Natanzon |
| 8,930,500 | B2 | 1/2015 | Marco et al. |
| 8,930,947 | B1 | 1/2015 | Derbeko et al. |
| 8,935,498 | B1 | 1/2015 | Natanzon |
| 8,949,180 | B1 | 2/2015 | Natanzon et al. |
| 8,954,673 | B1 | 2/2015 | Natanzon et al. |
| 8,954,796 | B1 | 2/2015 | Cohen et al. |
| 8,959,054 | B1 | 2/2015 | Natanzon |
| 8,977,593 | B1 | 3/2015 | Natanzon et al. |
| 8,977,826 | B1 | 3/2015 | Meiri et al. |
| 8,996,460 | B1 | 3/2015 | Frank et al. |
| 8,996,461 | B1 | 3/2015 | Natanzon et al. |
| 8,996,827 | B1 | 3/2015 | Natanzon |
| 9,003,138 | B1 | 4/2015 | Natanzon et al. |
| 9,026,696 | B1 | 5/2015 | Natanzon et al. |
| 9,031,913 | B1 | 5/2015 | Natanzon |
| 9,032,160 | B1 | 5/2015 | Natanzon et al. |
| 9,037,818 | B1 | 5/2015 | Natanzon et al. |
| 9,063,994 | B1 | 6/2015 | Natanzon et al. |
| 9,069,479 | B1 | 6/2015 | Natanzon |
| 9,069,709 | B1 | 6/2015 | Natanzon et al. |
| 9,081,754 | B1 | 7/2015 | Natanzon et al. |
| 9,081,842 | B1 | 7/2015 | Natanzon et al. |
| 9,087,008 | B1 | 7/2015 | Natanzon |
| 9,087,112 | B1 | 7/2015 | Natanzon et al. |
| 9,104,529 | B1 | 8/2015 | Derbeko et al. |
| 9,110,914 | B1 | 8/2015 | Frank et al. |
| 9,116,811 | B1 | 8/2015 | Derbeko et al. |
| 9,128,628 | B1 | 9/2015 | Natanzon et al. |
| 9,128,855 | B1 | 9/2015 | Natanzon et al. |
| 9,134,914 | B1 | 9/2015 | Derbeko et al. |
| 9,135,119 | B1 | 9/2015 | Natanzon et al. |
| 9,135,120 | B1 | 9/2015 | Natanzon |
| 9,146,878 | B1 | 9/2015 | Cohen et al. |
| 9,152,339 | B1 | 10/2015 | Cohen et al. |
| 9,152,578 | B1 | 10/2015 | Saad et al. |
| 9,152,814 | B1 | 10/2015 | Natanzon |
| 9,158,578 | B1 | 10/2015 | Derbeko et al. |
| 9,158,630 | B1 | 10/2015 | Natanzon |
| 9,160,526 | B1 | 10/2015 | Raizen et al. |
| 9,177,670 | B1 | 11/2015 | Derbeko et al. |
| 9,189,339 | B1 | 11/2015 | Cohen et al. |
| 9,189,341 | B1 | 11/2015 | Natanzon et al. |
| 9,201,736 | B1 | 12/2015 | Moore et al. |
| 9,223,659 | B1 | 12/2015 | Natanzon et al. |
| 9,225,529 | B1 | 12/2015 | Natanzon et al. |
| 9,235,481 | B1 | 1/2016 | Natanzon et al. |

(56) References Cited

U.S. PATENT DOCUMENTS

| | | |
|---|---|---|
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlaln |
| 2003/0182312 A1* | 9/2003 | Chen .................. G06F 11/1435 |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0188256 A1* | 8/2005 | Stager ................. G06F 11/1435 714/13 |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2007/0055833 A1 | 3/2007 | Vu et al. |
| 2007/0180304 A1 | 6/2007 | Kano |
| 2007/0198602 A1 | 8/2007 | Ngo et al. |
| 2007/0198791 A1 | 8/2007 | Iwamura et al. |
| 2012/0198174 A1* | 8/2012 | Nellans ............... G06F 12/0804 711/133 |
| 2012/0260038 A1* | 10/2012 | Imazaki ................ G06F 3/0608 711/114 |
| 2014/0195640 A1 | 7/2014 | Kaiser et al. |
| 2014/0351537 A1* | 11/2014 | Chen ...................... G06F 3/065 711/162 |
| 2016/0139836 A1 | 5/2016 | Nallathambi et al. |

OTHER PUBLICATIONS

U.S. Appl. No. 15/274,117, filed Sep. 23, 2016, Baruch.
U.S. Appl. No. 15/274,122, filed Sep. 23, 2016, Baruch et al.
U.S. Appl. No. 15/274,373, filed Sep. 23, 2016, Baruch et al.
U.S. Appl. No. 15/274,129, filed Sep. 23, 2016, Baruch et al.
U.S. Appl. No. 15/274,361, filed Sep. 20, 2016, Ayzenberg et al.
Gibon, "Five Point Plan Lies at the Heart of Compression Technology," Tech Talk; Apr. 29, 1991: 1 Page.
Soules et al., "Metadata Efficiency in Versioning File Systems;" 2nd USENIX Conference on File and Storage Technologies; Mar. 31, 2003-Apr. 2, 2003; 16 Pages.
AIX System Management Concepts: Operating Systems and Devices; Bull Electronics Angers; May 2000; 280 Pages.
Soules et al., "Metadata Efficiency in a Comprehensive Versioning File System;" May 2002; CMU-CS-02-145; School of Computer Science, Carnegie Mellon University; 33 Pages.

(56) References Cited

OTHER PUBLICATIONS

"Linux Filesystems," Sams Publishing; 2002; Chapter 1: Introduction to Filesystems pp. 17-22 and Chapter 3: Overview of Journaling Filesystems pp. 67-71; 12 Pages.
Bunyan et al., "Multiplexing in a BrightStor® ARCserve® Backup Release 11;" Mar. 2004; 4 Pages.
Marks, "Network Computing, 33;" Cover Story, Feb. 2, 2006; 8 Pages.
Hill, "Network Computing, NA;" Cover Story; Jun. 8. 2000; 9 Pages.
Microsoft Computer Dictionary, Fifth Edition; 2002; 3 Pages.
Wikipedia; Retrieved on Mar. 29, 2011 from http://en.wikipedia.org/wiki/DEFLATE: Deflate; 6 Pages.
Wikipedia; Retrieved on Mar. 29, 2011 from http://en.wikipedia.org/wiki/Huffman_coding: Huffman Coding; 11 Pages.
Wikipedia; Retrieved on Mar. 29, 2011 from http://en.wikipedia.org/wiki/LZ77: LZ77 and LZ78; 2 Pages.
U.S. Non-Final Office Action dated Apr. 9, 2018 for U.S. Appl. No. 15/274,362; 15 Pages.
Response to U.S. Non-Final Office Action dated Apr. 9, 2018 for U.S. Appl. No. 15/274,362; Response filed Jun. 26, 2018; 13 pages.
U.S. Non-Final Office Action dated Apr. 9, 2018 for U.S. Appl. No. 15/274,362; 14 pages.

\* cited by examiner

404'

```
Start identifying hotspots
of production volume
502
        ↓
Group contiguous
units into regions
504
        ↓
Track I/O requests for at
least one snapshot interval
506
        ↓
Predict I/O requests for at
least one future snapshot interval
508
        ↓
Rank regions
510
        ↓
Assign least-written regions
as cold regions
512
        ↓
Assign most-written as
hotspot regions
514
        ↓
Complete identifying hotspots
of production volume
516
```

*FIG. 5*

MULTILEVEL SNAPSHOT REPLICATION FOR HOT AND COLD REGIONS OF A STORAGE SYSTEM

CROSS-REFERENCE TO RELATED APPLICATIONS

This application claims the benefit under 35 U.S.C. § 119(e) of the filing date of U.S. provisional application No. 62/322,642, filed on Apr. 14, 2016, the teachings of which are incorporated herein by reference in their entireties.

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. A distributed storage system may include data protection systems that back up production site data by replicating production site data on a secondary backup storage system. The production site data may be replicated on a periodic basis and/or may be replicated as changes are made to the production site data. The backup storage system may be situated in the same physical location as the production storage system, or in a physically remote location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides a method that includes identifying one or more regions of the production volume and receives write requests to be written to the production volume during an operating time window. Each received write request is associated with at least one of the regions. Based upon at least one of the received write requests, one or more regions of the production volume are identified as hotspot regions and one or more regions of the production volume are identified as cold regions. For write requests associated with a hotspot region, snapshot replication is performed at a hotspot region snapshot interval, and for write requests associated with a cold region, snapshot replication is performed at one or more cold region snapshot intervals. The hotspot region snapshot interval is longer than the one or more cold region snapshot intervals.

Another aspect provides a system that includes a processor and memory storing computer program code that when executed on the processor causes the processor to operate a storage system. The storage system is operable to perform the operations of identifying one or more regions of a production volume of a storage system. Write requests to be written to the production volume are received during an operating time window, and each received write request is associated with at least one of the one or more regions. Based upon at least one the received write requests, one or more regions of the production volume are identified as hotspot regions and one or more regions of the production volume are identified as cold regions. For write requests associated with a hotspot region, snapshot replication is performed at a hotspot region snapshot interval, and for write requests associated with a cold region, snapshot replication is performed at one or more cold region snapshot intervals. The hotspot region snapshot interval is longer than the one or more cold region snapshot intervals.

Another aspect provides a computer program product including a non-transitory computer readable storage medium having computer program code encoded thereon that when executed on a processor of a computer causes the computer to operate a storage system. The computer program product includes computer program code for identifying one or more regions of a production volume of a storage system and computer program code for receiving write requests to be written to the production volume during an operating time window. Each received write request is associated with at least one of the one or more regions. The computer program product includes computer program code for identifying, based upon at least one of the received write requests, one or more regions of the production volume as hotspot regions and one or more regions of the production volume as cold regions. For write requests associated with a hotspot region, snapshot replication is performed at a hotspot region snapshot interval, and for write requests associated with a cold region, snapshot replication is performed at one or more cold region snapshot intervals. The hotspot region snapshot interval is longer than the one or more cold region snapshot intervals.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 5 is a flowchart of an example of a process to classify workloads of regions of the production volume, according to an illustrative embodiment of the instant disclosure;

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or data write request. In some embodiments, the term "storage system" may encompass physical computing systems, cloud or virtual computing systems, or a combination thereof. In some embodiments, the term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)). In some embodiments, the term "storage device" may also refer to a storage array including multiple storage devices.

Figure 1:
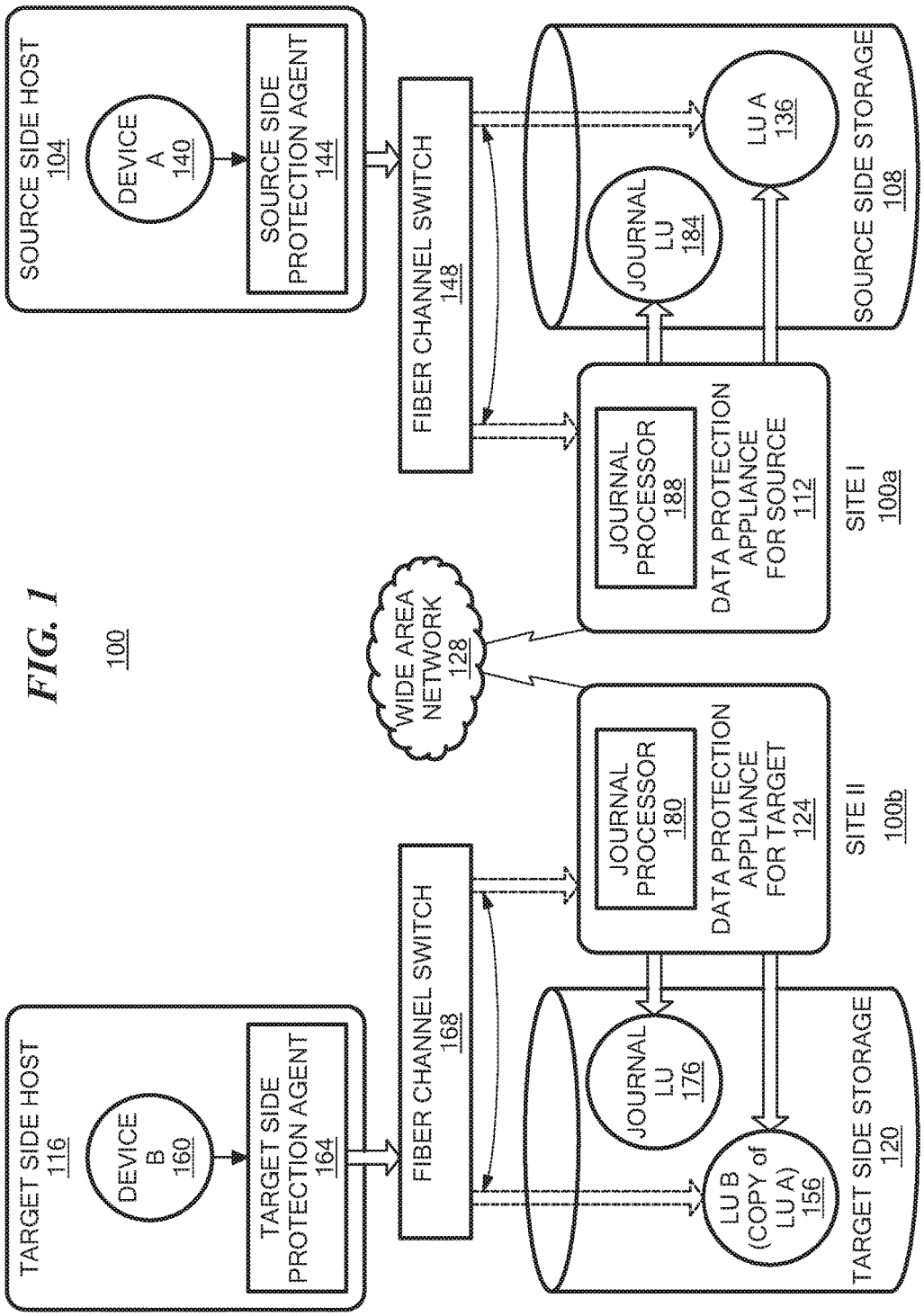
FIG. 1 is a block diagram of a data protection system, according to an illustrative embodiment of the instant disclosure.

Referring to the example embodiment shown in FIG. 1, a data protection system 100 may include two sites, Site I 100a and Site II 100b, which communicate via a wide area network (WAN) 128, such as the Internet. In some embodiments, under normal operation, Site I 100a may correspond to a source site (i.e., the transmitter within a data replication workflow) of system 100 and Site II 100b may be a target site (i.e., the receiver within a data replication workflow) of data protection system 100. Thus, in some embodiments, during normal operations, the direction of replicated data flow may be from Site I 100a to Site II 100b.

In certain embodiments, Site I 100a and Site II 100b may be remote from one another. In other embodiments, Site I 100a and Site II 100b may be local to one another and may be connected via a local area network (LAN). In some embodiments, local data protection may have the advantage of minimizing data lag between target and source, and remote data protection may have the advantage of being robust in the event that a disaster occurs at the source site.

In particular embodiments, data protection system 100 may include a failover mode of operation, wherein the direction of replicated data flow is reversed. In particular, in some embodiments, Site I 100a may behave as a target site and Site II 100b may behave as a source site. In some embodiments, failover may be triggered manually (e.g., by a user) or automatically. In many embodiments, failover may be performed in the event of a disaster at Site I 100a. In some embodiments, both Site I 100a and Site II 100b may behave as source site for some stored data and may behave simultaneously as a target site for other stored data. In certain embodiments, a portion of stored data may be replicated from one site to the other, and another portion may not be replicated.

In some embodiments, Site I 100a corresponds to a production site (e.g., a facility where one or more hosts run data processing applications that write data to a storage system and read data from the storage system) and Site II 100b corresponds to a backup or replica site (e.g., a facility where replicated production site data is stored). Thus, in some embodiments, Site II 100b may be responsible for replicating production site data and may enable rollback of data of Site I 100a to an earlier point in time. In some embodiments, rollback may be used in the event of data corruption of a disaster, or alternatively in order to view or to access data from an earlier point in time.

Some described embodiments of Site I 100a may include a source host 104, a source storage system (or "storage array") 108, and a source data protection appliance (DPA) 112 coupled via a first storage area network (SAN). Similarly, in some embodiments, Site II 100b may include a target host 116, a target storage system 120, and a target DPA 124 coupled via a second SAN. In some embodiments, each SAN may include one or more devices (or "nodes") that may be designated an "initiator," a "target", or both. For example, in some embodiments, the first SAN may include a first fiber channel switch 148 and the second SAN may include a second fiber channel switch 168. In some embodiments, communication links between each host 104 and 116 and its corresponding storage system 108 and 120 may be any appropriate medium suitable for data transfer, such as fiber communication channel links. In many embodiments, a host communicates with its corresponding storage system over a communication link, such as an InfiniBand (IB) link or Fibre Channel (FC) link, and/or a network, such as an Ethernet or Internet (e.g., TCP/IP) network that may employ, for example, the iSCSI protocol.

In some embodiments, each storage system 108 and 120 may include storage devices for storing data, such as disks or arrays of disks. Typically, in such embodiments, storage systems 108 and 120 may be target nodes. In some embodiments, in order to enable initiators to send requests to storage system 108, storage system 108 may provide (e.g., expose) one or more logical units (LU) to which commands are issued. Thus, in some embodiments, storage systems 108 and 120 may be SAN entities that provide multiple logical units for access by multiple SAN initiators. In some embodiments, an LU is a logical entity provided by a storage system for accessing data stored therein. In some embodiments, a logical unit may be a physical logical unit or a virtual logical unit. In some embodiments, a logical unit may be identified by a unique logical unit number (LUN).

In the embodiment shown in FIG. 1, storage system 108 may expose logical unit 136, designated as LU A, and storage system 120 exposes logical unit 156, designated as LU B. LU B 156 may be used for replicating LU A 136. In such embodiments, LU B 156 may be generated as a copy of LU A 136. In one embodiment, LU B 156 may be configured so that its size is identical to the size of LU A 136.

As shown in FIG. 1, in some embodiments, source host 104 may generate a host device 140 ("Device A") corresponding to LU A 136 and source host 116 may generate a host device 160 ("Device B") corresponding to LU B 156. In some embodiments, a host device may be a logical entity within a host through which the host may access an LU. In some embodiments, an operating system of a host may generate a host device for each LU exposed by the storage system in the host SAN.

In some embodiments, source host 104 may act as a SAN initiator that issues I/O requests through host device 140 to LU A 136 using, for example, SCSI commands. In some embodiments, such requests may be transmitted to LU A 136 with an address that includes a specific device identifier, an offset within the device, and a data size.

In some embodiments, source DPA 112 and target DPA 124 may perform various data protection services, such as data replication of a storage system, and journaling of I/O requests issued by hosts 104 and/or 116. In some embodiments, when acting as a target DPA, a DPA may also enable rollback of data to an earlier point-in-time (PIT), and enable processing of rolled back data at the target site. In some embodiments, each DPA 112 and 124 may be a physical device, a virtual device, or may be a combination of a virtual and physical device.

In some embodiments, a DPA may be a cluster of such computers. In some embodiments, use of a cluster may ensure that if a DPA computer is down, then the DPA functionality switches over to another computer. In some embodiments, the DPA computers within a DPA cluster may communicate with one another using at least one communication link suitable for data transfer, for example, an InfiniBand (IB) link, a Fibre Channel (FC) link, and/or a network link, such as an Ethernet or Internet (e.g., TCP/IP) link to transfer data via fiber channel or IP based protocols, or other such transfer protocols. In some embodiments, one computer from the DPA cluster may serve as the DPA leader. In some embodiments, the DPA cluster leader may coordinate between the computers in the cluster, and may also perform other tasks that require coordination between the computers, such as load balancing.

In certain embodiments, a DPA may be a standalone device integrated within a SAN. Alternatively, in some embodiments, a DPA may be integrated into storage system. In some embodiments, the DPAs communicate with their respective hosts through communication links suitable for data transfer, for example, an InfiniBand (IB) link, a Fibre Channel (FC) link, and/or a network link, such as an Ethernet or Internet (e.g., TCP/IP) link to transfer data via, for example, SCSI commands or any other protocol.

In various embodiments, the DPAs may act as initiators in the SAN. For example, in some embodiments, the DPAs may issue I/O requests using, for example, SCSI commands, to access LUs on their respective storage systems. In some embodiments, each DPA may also be configured with the necessary functionality to act as targets, e.g., to reply to I/O requests, such as SCSI commands, issued by other initiators in the SAN, including their respective hosts. In some embodiments, being target nodes, the DPAs may dynamically expose or remove one or more LUs. As described herein, in some embodiments, Site I 100*a* and Site II 100*b* may each behave simultaneously as a production site and a backup site for different logical units. As such, in some embodiments, DPA 112 and DPA 124 may each behave as a source DPA for some LUs and as a target DPA for other LUs, at the same time.

In the example embodiment shown in FIG. 1, hosts 104 and 116 include protection agents 144 and 164, respectively. In some embodiments, protection agents 144 and 164 may be intercept commands (e.g., SCSI commands) issued by their respective hosts to LUs via host devices (e.g., host devices 140 and 160). In some embodiments, a protection agent may act on intercepted SCSI commands issued to a logical unit in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. In some embodiments, protection agents 144 and 164 may handle different SCSI commands, differently, according to the type of the command. For example, in some embodiments, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. For example, in some embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. Similarly, in some embodiments, when a DPA behaves as a target device for a certain LU, then during normal course of operation, the associated protection agent fails I/O requests issued by host to the host device corresponding to that LU.

In some embodiments, communication between protection agents 144 and 164 and a respective DPA 112 and 124 may use any protocol suitable for data transfer within a SAN, such as fiber channel, SCSI over fiber channel, or other protocols. In some embodiments, the communication may be direct, or via a logical unit exposed by the DPA.

In certain embodiments, protection agents may be drivers located in their respective hosts. Alternatively, in some embodiments, a protection agent may also be located in a fiber channel switch, or in any other device situated in a data path between a host and a storage system or on the storage system itself. In some embodiments, in a virtualized environment, the protection agent may run at the hypervisor layer or in a virtual machine providing a virtualization layer.

Figure 2:
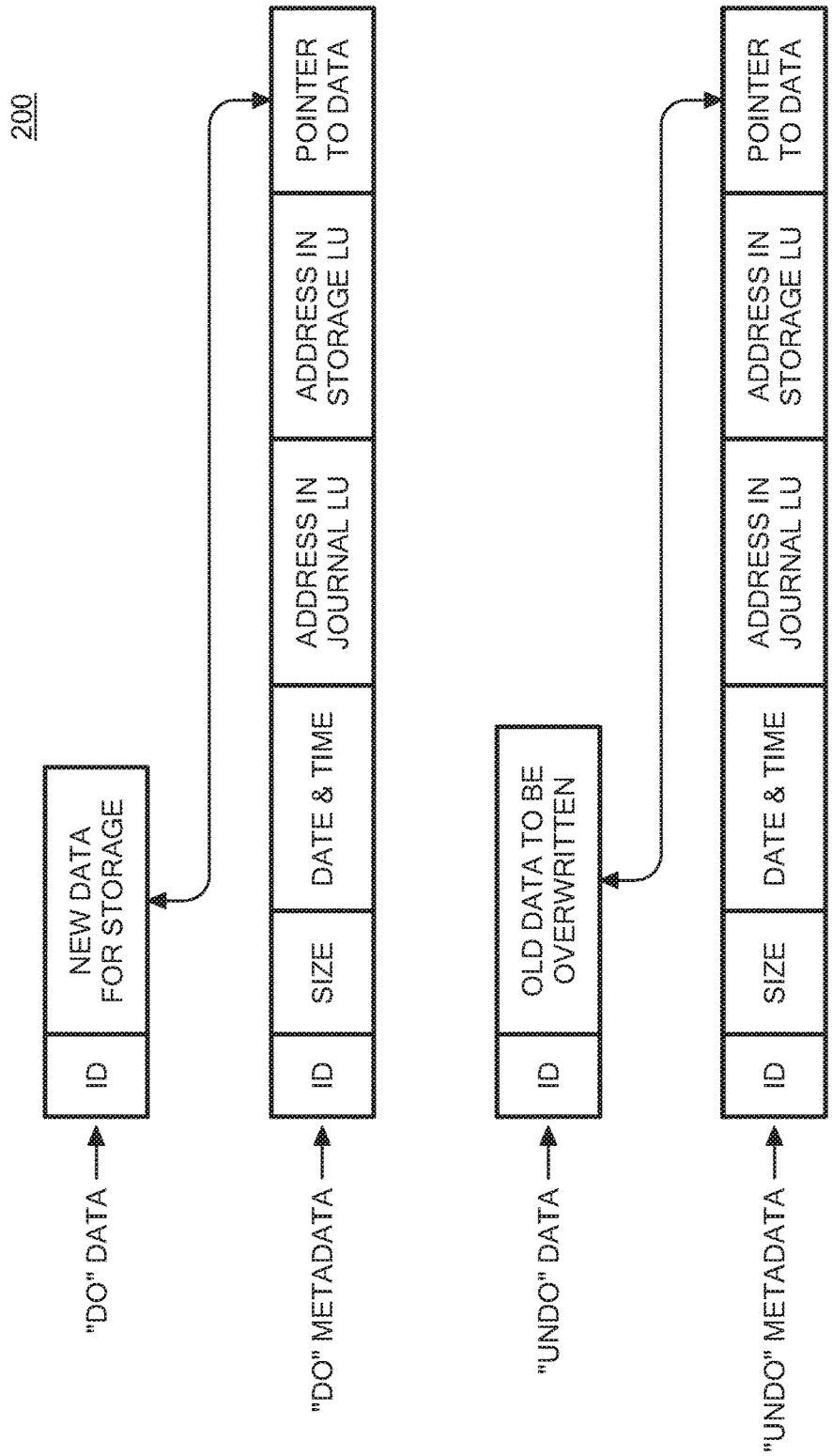
FIG. 2 is a diagram illustrating a journal history of write transactions for the data protection system of FIG. 1, according to an illustrative embodiment of the instant disclosure.

As shown in the example embodiment shown in FIG. 1, target storage system 120 may expose a journal LU 176 for maintaining a history of write transactions made to LU B 156, referred to herein as a "journal." In some embodiments, a journal may be used to provide access to storage at specified points-in-time (PITs), as discussed in greater detail in regard to FIG. 2. In some embodiments, the journal may be stored across multiple LUs (e.g., using striping, etc.). In some embodiments, target DPA 124 may include a journal processor 180 for managing the journal within journal LU 176. Referring back to the example embodiment of FIG. 1, journal processor 180 may manage the journal entries of LU B 156. Specifically, in some embodiments, journal processor 180 may enter write transactions received by the target DPA 124 from the source DPA 112 into the journal by writing them into journal LU 176, read the undo information for the transaction from LU B 156, update the journal entries in journal LU 176 with undo information, apply the journal transactions to LU B 156, and remove already-applied transactions from the journal. In one embodiment, journal processor 180 may perform processing such as described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Some embodiments of data protection system 100 may be provided as physical systems for the replication of physical LUs, or as virtual systems for the replication of virtual LUs. For example, in one embodiment, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and exposes files in the Network File System (NFS) as SCSI devices to virtual hosts.

In some embodiments, in normal operation (sometimes referred to as "production mode"), DPA 112 may act as a source DPA for LU A 136. Thus, in some embodiments, protection agent 144 may act as a source protection agent, specifically by splitting I/O requests to host device 140 ("Device A"). In some embodiments, protection agent 144 may send an I/O request to source DPA 112 and, after receiving an acknowledgement from source DPA 112, may send the I/O request to LU A 136. In some embodiments, after receiving an acknowledgement from storage system 108, host 104 may acknowledge that the I/O request has successfully completed.

In some embodiments, when source DPA 112 receives a replicated I/O request from protection agent 144, source DPA 112 may transmit certain I/O information characterizing the write request, packaged as a "write transaction", over WAN 128 to target DPA 124 for journaling and for incorporation within target storage system 120. In some embodiments, when applying write operations to storage system 120, target DPA 124 may act as an initiator, and may send SCSI commands to LU B 156.

In some embodiments, source DPA 112 may send its write transactions to target DPA 124 using a variety of modes of transmission, including (i) a synchronous mode, (ii) an asynchronous mode, and (iii) a snapshot mode.

In some embodiments, in synchronous mode, source DPA 112 may send each write transaction to target DPA 124, may receive back an acknowledgement from the target DPA 124, and in turn may send an acknowledgement back to protection agent 144. In some embodiments, in synchronous mode, protection agent 144 may wait until receipt of such acknowledgement before sending the I/O request to LU 136.

In some embodiments, in asynchronous mode, source DPA 112 may send an acknowledgement to protection agent 144 upon receipt of each I/O request, before receiving an acknowledgement back from target DPA 124.

In some embodiments, in snapshot mode, source DPA 112 may receive several I/O requests and combine them into an aggregate "snapshot" or "batch" of write activity performed in the multiple I/O requests, and may send the snapshot to target DPA 124 for journaling and incorporation in target storage system 120. In some embodiments, in snapshot mode, source DPA 112 may send an acknowledgement to protection agent 144 upon receipt of each I/O request, before receiving an acknowledgement back from target DPA 124.

In some embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

As described herein, in some embodiments, in normal operation, LU B 156 may be used as a backup of LU A 136. As such, while data written to LU A 136 by host 104 is replicated from LU A 136 to LU B 156, target host 116 should not send I/O requests to LU B 156. In some embodiments, to prevent such I/O requests from being sent, protection agent 164 may act as a target site protection agent for host device B 160 and may fail I/O requests sent from host 116 to LU B 156 through host device B 160. In some embodiments, in a recovery mode, target DPA 124 may undo the write transactions in journal LU 176 so as to restore the target storage system 120 to an earlier state.

Referring to FIG. 2, in some described embodiments, a write transaction 200 may be included within a journal and stored within a journal LU. In some embodiments, write transaction 200 may include one or more identifiers; a time stamp indicating the date and time at which the transaction was received by the source DPA; a write size indicating the size of the data block; a location in the journal LU where the data is entered; a location in the target LU where the data is to be written; and the data itself.

Referring to both FIGS. 1 and 2, in some embodiments, transaction 200 may correspond to a transaction transmitted from source DPA 112 to target DPA 124. In some embodiments, target DPA 124 may record write transaction 200 in the journal that includes four streams. In some embodiments, a first stream, referred to as a "DO" stream, includes a copy of the new data for writing to LU B 156. In some embodiments, a second stream, referred to as a "DO METADATA" stream, includes metadata for the write transaction, such as an identifier, a date and time, a write size, the offset within LU B 156 where the new data is written, and a pointer to the offset in the DO stream where the corresponding data is located. In some embodiments, a third stream, referred to as an "UNDO" stream, includes a copy of the data being overwritten within LU B 156 (referred to herein as the "old" data). In some embodiments, a fourth stream, referred to as an "UNDO METADATA" stream, includes an identifier, a date and time, a write size, a beginning address in LU B 156 where data was (or will be) overwritten, and a pointer to the offset in the UNDO stream where the corresponding old data is located.

Since the journal contains the "undo" information necessary to rollback storage system 120, in some embodiments, data that was stored in specific memory locations at a specified point in time may be obtained by undoing write transactions that occurred subsequent to such point in time (PIT).

In some embodiments, each of the four streams may hold a plurality of write transaction data. In some embodiments, as write transactions are received dynamically by the target DPA, the write transactions may be recorded at the end of the DO stream and the end of the DO METADATA stream, prior to committing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data.

Some described embodiments may validate that point-in-time (PIT) data replicas (e.g., data replicated to LU B 156) are valid and usable, for example to verify that the data replicas are not corrupt due to a system error or inconsistent due to violation of write order fidelity. In some embodiments, validating data replicas can be important, for example, in data replication systems employing incremental backup where an undetected error in an earlier data replica may lead to corruption of future data replicas.

In conventional systems, validating data replicas can increase the journal lag (e.g., for transaction 200 of FIG. 2), which may increase a recovery time objective (RTO) of data protection system 100 (e.g., an elapsed time between replicas or PITs). In such conventional systems, if the journal lag time is significant, the journal may become full and unable to account for data changes due to subsequent transactions. Further, in such conventional systems, validating data replicas may consume system resources (e.g., processor time, memory, communication link bandwidth, etc.), resulting in reduced performance for system tasks.

Figure 3:
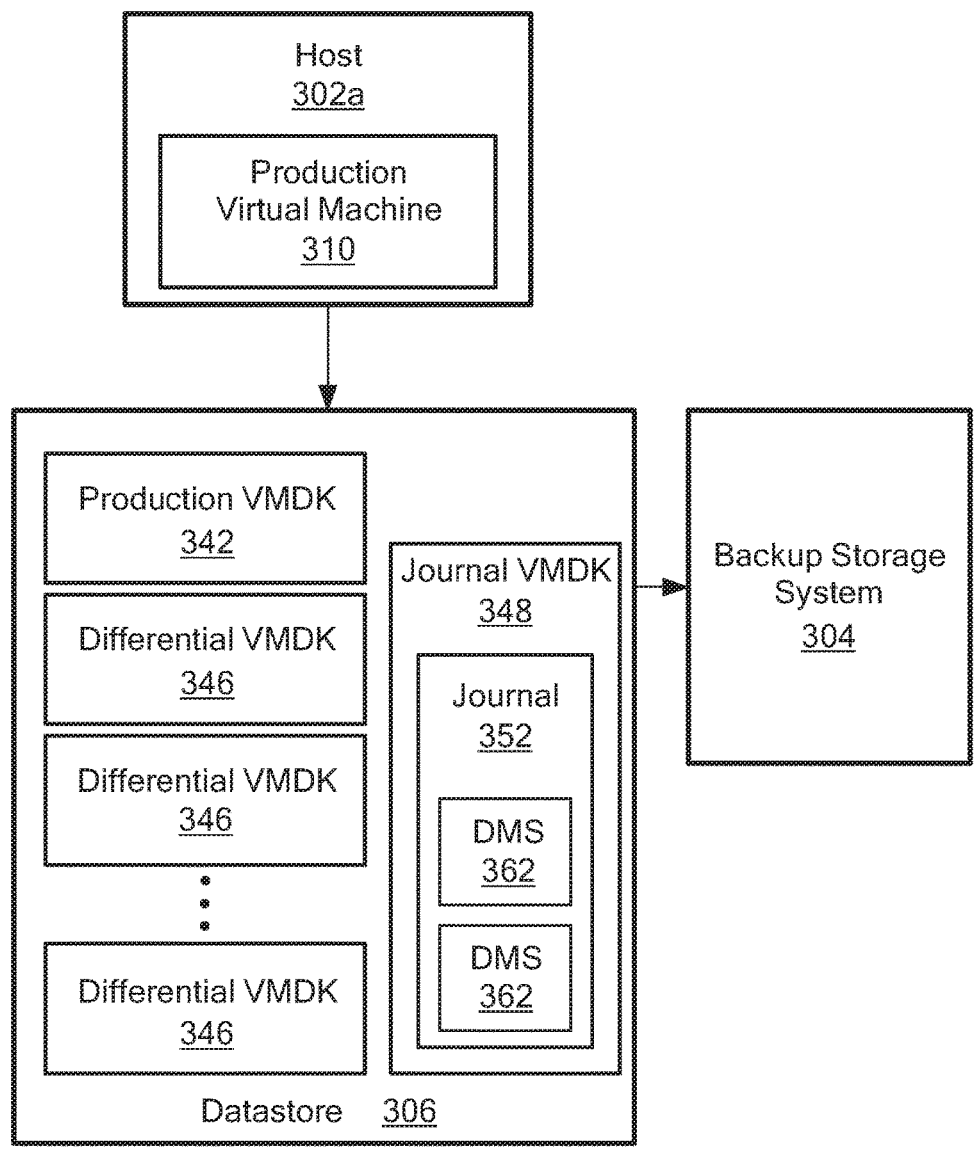
FIG. 3 is a block diagram of an example of a data protection system to perform snapshot replication on a storage system not configured to support snapshot replication, according to an illustrative embodiment of the instant disclosure.

Referring to FIG. 3, in an illustrative embodiment, a data protection system 300 may include host 302a and datastore 306. Host 302a may include production virtual machine 310. In some embodiments, host 302a may include a data protection appliance to provide snapshot replication of data of production virtual machine 310.

In some embodiments, such as shown in FIG. 3, datastore 306 may include one or more production virtual machine disks, shown as production VMDK 342, and one or more differential virtual machine disks, shown as differential VMDKs 346. Some embodiments of datastore 306 may also include journal virtual machine disk 348. In some embodiments, the differential VMDKs 346 may be used to store differential snapshot data representative of changes that happened to data stored on production VMDK 342. In one example, a first differential VMDK 346 may include changes due to writes that occurred to production VMDK 342 from time t1 to time t2, a second differential VMDK 346 may include the changes due to writes that occurred to production VMDK 342 from time t2 to time t3, and so forth.

In some embodiments, differential VMDKs 346 may be thin provisioned. In some embodiments, thin provisioning allocates storage space to volumes of a SAN in a flexible manner among multiple volumes based on a minimum space requirement for each volume at any given time. In some embodiments, data protection system 300 may include one or more consistency groups. In some embodiments, a consistency group may treat source volumes (e.g., production volumes) and target volumes (e.g., backup volumes) as a single logical entity for data replication and migration.

In some embodiments, journal 352 may be stored in journal VMDK 348. In some embodiments, journal 352 includes one or more delta marker streams (DMS) 362. In some embodiments, each DMS 362 may include metadata associated with data that may be different between one differential VMDK and another differential VMDK.

In one example, DMS 362 may include the metadata differences between a current copy of the production VMDK 342 and a copy currently stored in backup storage 304. In some embodiments, journal 352 does not include the actual data changes, but rather metadata associated with the changes. In some embodiments, the data of the changes may be stored in the differential VMDKs. Thus, some embodiments may operate employing thin volumes to perform data replication by tracking regions for replications with the thin devices, as described herein. Other embodiments may operate to replicate data directly (e.g., without employing thin devices) from a source storage to a target (or replica) storage.

In some embodiments, such as shown in FIG. 3, illustrative data protection system 300 may employ multilevel snapshot replication. For example, in some embodiments, snapshots may be replicated in stages such that "cold" regions may be replicated periodically in smaller snapshot intervals and "hotspot" regions may be replicated periodically at one or more larger snapshot intervals. In some embodiments, the various snapshot intervals may be configured by a user of data protection system 300, for example based upon one or more desired Recovery Point Objective (RPOs). In some embodiments, RPO may be an amount of data that the user is willing to lose in case of production disaster (e.g., an amount of time between replications).

In some embodiments, a point-in-time (PIT) replica may be generated based upon a combination of snapshot replicas from hotspot regions and snapshot replicas from cold regions. Thus, in some embodiments, hotspot regions that are frequently overwritten may batch multiple writes into a single snap interval (e.g., reduce network bandwidth consumption for replication), while cold regions that are less frequently overwritten may be replicated soon after a modification (e.g., maintain a low RPO). In some embodiments, the lower the RPO, the higher the granularity of points in time (PITs) for restoring a production volume (e.g., since replicas will be generated more frequently).

In some embodiments, in snapshot replication, snapshot replicas of a production volume are periodically generated (e.g., every snapshot interval), and changes in data may be tracked between consecutive snapshot replicas. For example, one or more write operations may modify data on the production volume between generation of snapshot replicas. In some embodiments, regions of the production volume that are modified, and the changed data written to the regions, may be tracked. In some embodiments, when a new snapshot replica is generated, modified regions may be read from the production volume and sent to the replica volume. In some embodiments, if there were numerous overwrites to the same region (a "hotspot"), these changes may be "batched" or "folded" such that only the final content of the region is sent to the replica volume.

In some embodiments, increasing the duration of a snapshot interval may reduce the bandwidth required for replication since data is sent to the replica volume less frequently. However, in such embodiments, each snapshot replica may then be larger in size. However, in such embodiments, this reduction in required bandwidth may be at the expense of providing longer RPOs and, thus, larger granularity of PITs that can be recovered. Further, increasing the snapshot interval in such embodiments requires increased storage space to track changes between snapshots and also requires reading additional modified data from the production volume when generating a snapshot replica.

Some described embodiments may employ a multilevel snapshot replication mode that may identify "hotspot" regions of the production volume that receive frequent write requests, and "cold" regions of the production volume that receive infrequent write requests. In an illustrative embodiment, identified hotspot regions may be replicated with hotspot region snapshot replication (e.g., with a relatively longer snapshot interval), and identified cold regions may be replicated by cold region snapshot replication (e.g., with a relatively shorter snapshot duration). Although described herein generally as hotspot regions or cold regions, multiple intermediate regions may be employed in some embodiments. For example, in some embodiments, each region may employ varying snapshot durations ranging from a shortest snapshot duration for a cold region and progressing to a longest snapshot duration for a hotspot region.

Figure 4:
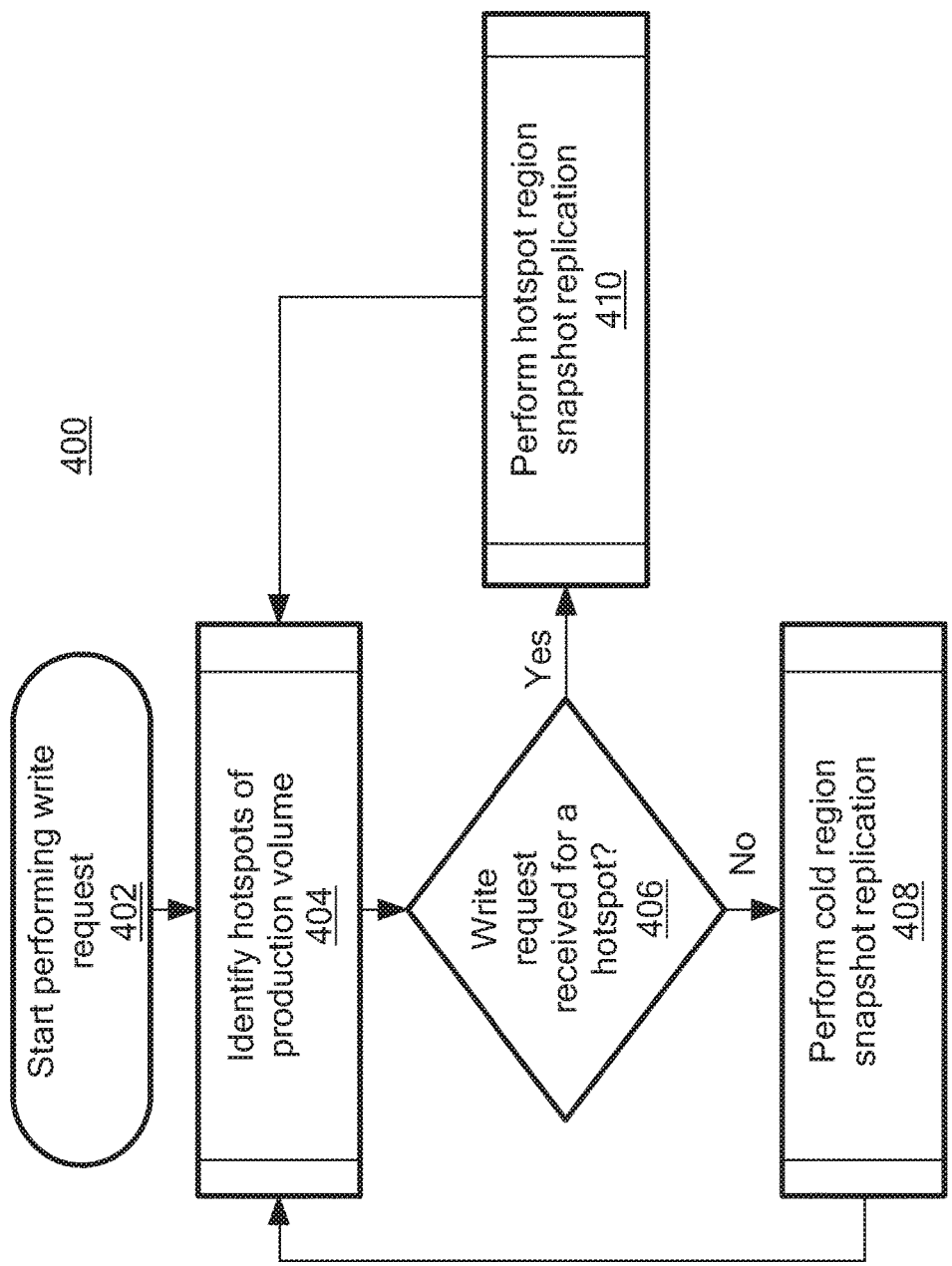
FIG. 4 is a flowchart of an example of a process to perform a write request to a production volume of a data protection system, according to an illustrative embodiment of the instant disclosure.

Referring to FIG. 4, a flowchart is shown for an illustrative process, 400, for performing write requests to a production volume. At block 402, process 400 begins. At block 404, in some embodiments, statistics of the workload of the production volume may be tracked (e.g., types of accesses and to which regions of the volume) to classify regions of the production as hotspot regions or cold regions. In some embodiments, block 404 may be performed periodically, for example during each of a plurality of snapshot intervals of data protection system 100. Block 404 will be described in greater detail in regard to FIG. 5.

In some embodiments, at block 406, if a write request received by the protection agent is a request to write data to a region of the production volume identified as a hotspot region, then at block 410, the write request may be replicated using hotspot region snapshot replication. In other words, in some embodiments, a write request to a hotspot region of the production volume may not be replicated immediately, and instead may be written to a thin device (e.g., one of VMDKs 346) along with associated journal metadata to track changes to the production volume that need to be replicated. In some embodiments, data that is changed (e.g., dirty data) may be replicated from the thin device to backup storage at a subsequent hotspot region snapshot interval (e.g., a relatively longer interval). In some embodiments, snapshot replicas generated at block 410 may be snapshot replicas associated only with a given one or more hotspot regions. In other embodiments, snapshot replicas may be snapshot replicas associated with the entire production volume. Process 400 may return to block 404 to update identifications of hotspots of the production volume based on new write requests.

In some embodiments, at block 406, if a write request received by the protection agent is a request to write data to a region of the production volume identified as a cold region, then at block 408, the write request may be replicated by cold region snapshot replication. In other words, in some embodiments, a write request to a cold region of the production volume may not be replicated immediately, and instead may be written to a thin device (e.g., one of VMDKs 346) along with associated journal metadata to track changes to the production volume that need to be replicated. In some embodiments, data that is changed (e.g., dirty data) may be replicated from the thin device to backup storage at a subsequent cold region snapshot interval (e.g., a relatively shorter interval). In some embodiments, snapshot replicas generated at block 408 may be snapshot replicas associated only with a given one or more hotspot regions. In other embodiments, snapshot replicas may be snapshot replicas associated with the entire production volume. In some embodiments, process 400 may return to block 404 to update identifications of hotspots of the production volume based on new write requests.

In some embodiments, snapshot replicas for hotspot regions (e.g., as generated at block 410) may employ a first thin volume (e.g., a first one of VMDKs 346), and snapshot replicas for cold regions (e.g., as generated at block 408) may employ a second thin volume (e.g., a second one of VMDKs 346).

In some embodiments, snapshot replication (e.g., block 410 of FIG. 4) may be performed as described in co-pending U.S. patent application Ser. No. 14/979,897, filed on Dec. 28, 2015, entitled "Performing Snapshot Replication on a Storage System not Configured to Support Snapshot Replication," which is hereby incorporated by reference herein in its entirety.

Referring to FIG. 5, additional detail of block 404 of FIG. 4 is shown as process 404'. At block 502, process 404' begins. In some embodiments, at block 504, storage units of the production volume may be grouped into one or more regions. For example, a given volume may include a plurality of physical blocks. In some embodiments, a physical block may be an addressable unit where data may be written to and/or read (e.g., a sector or a page may be a smallest addressable unit of a volume). In some embodiments, a logical block may include one or more physical blocks. In some embodiments, at block 504, one or more physical and/or logical blocks, generally referred to herein as "blocks", may be grouped into a region. In some embodiments, each region may include one or more contiguous (or consecutive) blocks. In an illustrative embodiment, each block may be a 4 KB block, and each region may include at least one block. For example, in some embodiments, each region may be between 256 KB and 64 MB.

In some embodiments, at block 506, IO requests (e.g., write requests) are tracked per region for one or more snapshot intervals. As will be described, in some embodiments, write requests may be tracked as a number of received requests for each region and/or as an amount of data written per region, for one or more snapshot intervals. At block 508, some embodiments may predict IO requests that may be received in one or more future snapshot intervals, for example, based upon one or more previous snapshot intervals. For example, in some embodiments, prediction may be based upon the number write requests or amount of data written to each region in one or more previous snapshot intervals, an average over two or more previous snapshot intervals, a time weighted function of two or more snapshot intervals, or knowledge that certain regions may be typically hot or cold for a given application. For example, a database application may typically repeatedly access a given subset of regions.

At block 510, some embodiments may rank regions based upon the tracked IO requests (e.g., by number of write requests and/or amount of data written), or some embodiments may optionally rank regions based upon the I/O requests predicted at block 508.

In some embodiments, at block 512, regions having write requests below a threshold, or a percentage (X %) of the total number of regions having the fewest relative write requests (or the least relative data written, as determined at blocks 506 and, optionally, block 508) may be identified as cold regions. In some embodiments, at block 514, regions having write requests at or above a threshold, or a percentage (1-X %) of the total number of regions having the most relative write requests (or the most relative data written), may be identified as hotspot regions. At block 516, process 404' completes. As described herein, in some embodiments, process 404' may be performed periodically, for example during each of a plurality of snapshot intervals of the data protection system.

As described in regard to FIGS. 4 and 5, in some embodiments, regions of the production volume that have relatively frequent write requests (e.g., overwrites) may be protected using hotspot region snapshot replication, while regions of the production volume that have relatively infrequent write requests may be protected using cold region snapshot replication. Thus, some described embodiments may provide a multilevel snapshot replication that reduces bandwidth employed to provide replication (e.g., the bandwidth of WAN 128 of FIG. 1).

In some embodiments, the number of write requests received and/or the amount of data written during a most recent snapshot interval may be considered for each region when determining whether to identify the region as a hotspot region or a cold region. In other embodiments, the number of write requests received and/or the amount of data written during two or more snapshot intervals may be considered for each region, for example as an average, when determining whether to perform snapshot replication or continuous replication. In some embodiments, a number of write requests and/or the amount of data written per region may, additionally or alternatively, be predicted for one or more future snapshot intervals.

As described in regard to FIG. 5, some embodiments may assign one or more regions to the production volume. In some embodiments, each region may span multiple contiguous (or consecutive) 4 KB blocks, for example to reduce write request tracking overhead. For each region, described embodiments track a number of write requests received and/or a number of bytes written during one or more previous snapshot intervals. In each snapshot interval, a ranking value may be determined as an amount of data written to each region, divided by the size of the region, may be determined. In some embodiments, an average amount of data written to a region may be determined based upon a rolling window or a recency value. The higher the ranking value for a region, the more likely the region will be written repeatedly in a next snapshot interval.

In some embodiments, regions may be assigned to either continuous replication or snapshot replication. For example, the X % of regions with the fewest predicted overwrites (e.g., the X % regions with the lowest ranking values) may be assigned to continuous replication, and the remaining 100–X % of regions (e.g., the 100–X % with the highest ranking values) may be assigned to snapshot replication. Further, as I/O patterns change over time, in some embodiments, regions may be re-classified (e.g., hotspot or non-hotspot) between continuous replication or snapshot replication over one or more snapshot intervals.

In some embodiments, the percentage of regions that may be identified as hotspot regions and the percentage of regions that may be identified as cold regions may be based on user settings, for example, the RPO of data protection system 300. In some embodiments, the percentage of regions that may be identified as hotspot regions and the percentage of regions that may be identified as cold regions may be additionally or alternatively based on dynamically determined operating conditions of data protection system 300, for example, network bandwidth, network quality, priority levels of various storage volumes, and other properties.

For example, if an illustrative embodiment of data protection system 300 employs a snapshot interval of 6 hours (e.g., based on a desired RPO), cold regions may instead be replicated at a much shorter snapshot interval (e.g., several minutes). In such an embodiment, cold regions that were modified by a write request (e.g., cold regions that include dirty data) may be replicated directly from a production volume before the completion of a snapshot interval. In such an embodiment, later, when the snapshot interval completes, a snapshot replica of the production volume may be generated. In some embodiments, the later snapshot replica may be smaller than a snapshot replica generated by a conventional snapshot replication system since the cold regions were already copied to the replica volume. Thus, in some embodiments, the later snapshot replica includes hotspot regions (and, in some instances, some data changed for cold regions), but cold regions already copied can be left out of the later snapshot replica.

As described herein, multilevel snapshot replication may enable embodiments of data protection system 300 to dynamically adjust between an amount of bandwidth required to replicate I/O requests (e.g., between the cold region snapshot replication and the hotspot region snapshot replication). As described herein, embodiments of data protection system 300 may also dynamically reassign regions from being identified as cold regions to being identified as hotspot regions to further adjust consumed network bandwidth (e.g., of WAN 128 of FIG. 1) as I/O patterns change over time.

As shown in FIG. 5, described embodiments may employ workload statistics and probability estimates to identify which regions of the production volume are hotspot regions and which are cold regions. Further, in some embodiments, this identification of regions may change over time. Further, in some embodiments (e.g., when the production volume is small and all or most regions are frequently written), an entire volume may be classified as a hotspot region, in which case only hotspot region snapshot replication may be employed (e.g., block 410 of FIG. 4), which may reduce bandwidth consumption. Similarly, in some embodiments (e.g., when the production volume is large and I/O requests are sparse and/or scattered), an entire volume may be classified as a cold region, in which case only cold region snapshot replication will be employed, which may reduce the RPO and provided increased PIT granularity. In more typical examples, embodiments will employ a hybrid mix of cold region snapshot replication and hotspot region snapshot replication.

Figure 6:
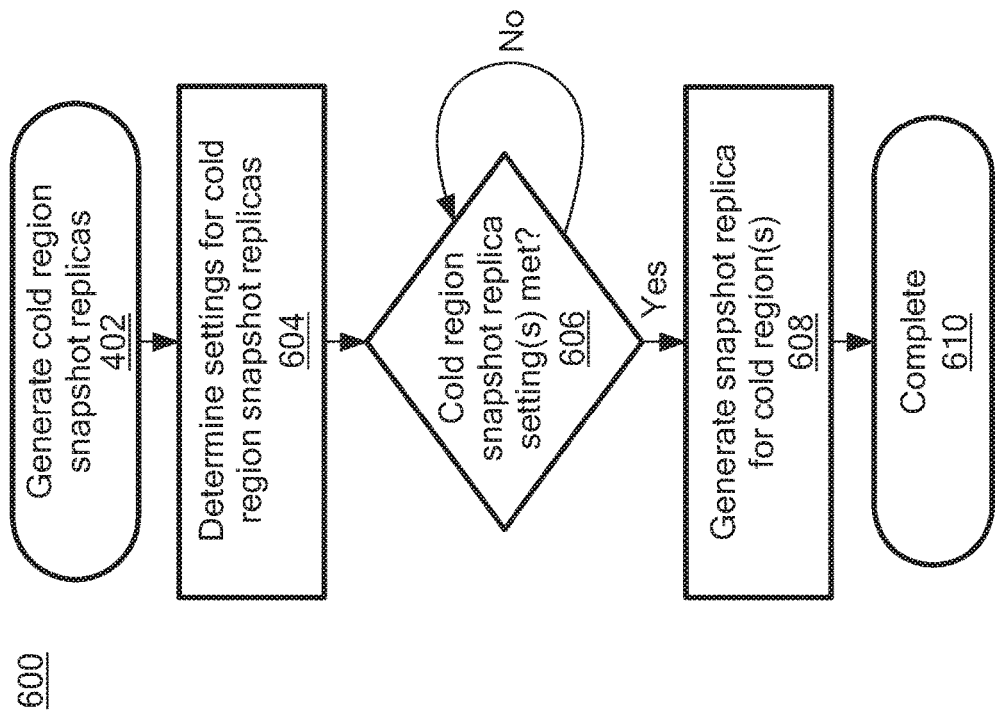
FIG. 6 is a flowchart of an example of a process to generate snapshot replicas for cold regions of the production volume, according to an illustrative embodiment of the instant disclosure.

In some embodiments, the snapshot interval for hotspot regions may be determined based upon a desired RPO, while the snapshot interval for cold regions may be dynamically determined by data protection system 300. For example, in some embodiments, snapshot replicas for cold regions may be created based on available network bandwidth (e.g., to send the snapshot replica to the replica volume) and an amount of modified data in each cold region. For example, referring to FIG. 6, a flowchart of process 600 for generating snapshot replicas for cold regions is shown. At block 602, process 600 begins.

In some embodiments, at block 604, one or more settings for cold region snapshot replication may be set. For example, one or more bandwidth thresholds (e.g., a minimum threshold and a maximum threshold) may be set that define a minimum and maximum bandwidth that may be consumed for sending cold region snapshot replicas to the replica volume. Some embodiments may define one or more cold region snapshot intervals that are shorter than the hotspot region snapshot interval (e.g., the RPO interval). Some embodiments may generate a snapshot for a cold region when the size of a thin volume for storing metadata for a cold region reaches or exceeds a threshold size.

In some embodiments, at block 606, if the settings for the cold region snapshot generation are met (e.g., completion of the cold region snapshot interval), then at block 608, a cold region snapshot replica is generated in accordance with the settings determined at block 604. At block 610, process 600 completes.

Figure 7:
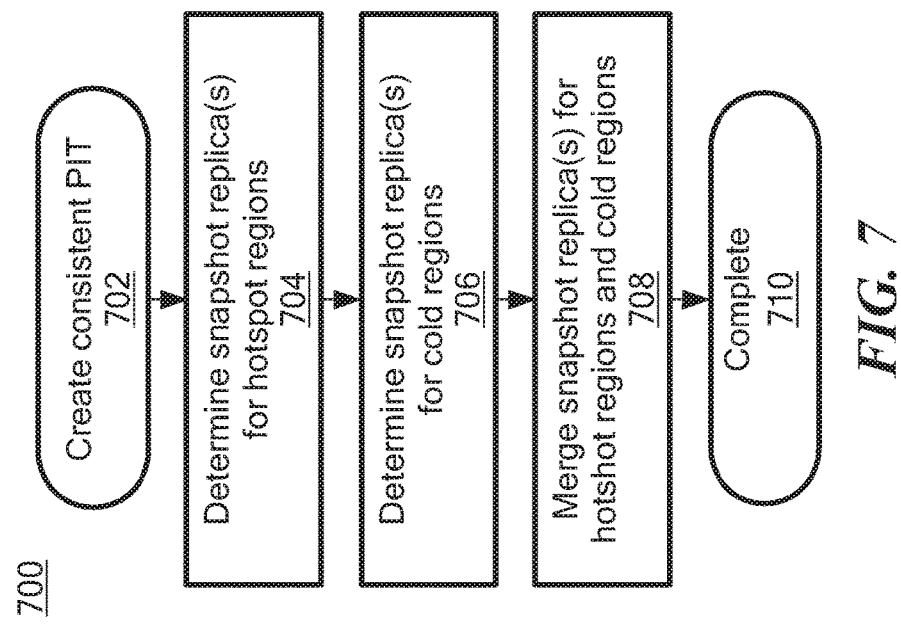
FIG. 7 is a flowchart of an example of a process to generate a consistent point-in-time (PIT), according to an illustrative embodiment of the instant disclosure.

Some embodiments may then merge snapshot replicas for cold regions and snapshot replicas for hotspot regions in order to create a consistent point-in-time (PIT) for the entire production volume. For example, referring to FIG. 7, process 700 for generating a consistent PIT is shown. At block 702, process 700 begins. In some embodiments, at block 704, a snapshot replica for one or more hotspot regions may be selected for the PIT. In some embodiments, at block 706, a snapshot replica for one or more cold regions may be selected for the PIT. In some embodiments, at block 708, the snapshot replicas for the hotspot regions and the snapshot replicas for the cold regions are merged to generate a consistent PIT, for example to allow rolling back of the production volume to the associated point-in-time. In some embodiments, at block 710, process 700 completes. In an embodiment, a PIT is generated after a snapshot replica is generated for the hotspot region (e.g., after the completion of an RPO snapshot interval).

In some embodiments, since X % of the production volume is identified as cold regions, snapshot replicas generated at the RPO interval (e.g., the hotspot region snapshot interval) contain less data than a conventional snapshot replica because only data for hotspot regions is replicated in the snapshot generated at the RPO interval. Thus, in some embodiments, less data is read from the production volume at each RPO snapshot interval to generate a snapshot than in conventional systems. Thus, some described embodiments may achieve increased efficiency because hotspot regions are replicated using smaller snapshot replicas and less data is read from the production volume to generate the RPO snapshot. Additionally, in some embodiments, multilevel snapshot replication may smooth the spiky or bursty load on the production volume, network and replica volume that characterizes conventional snapshot replication.

Further, some described embodiments reduce storage overhead required for replication. In such embodiments, since cold regions are replicated at a shorter snapshot interval, fewer I/O requests to cold regions are written to the thin volume (e.g., VMDKs 342 and 346 of FIG. 3), thus, reducing the size of the thin volumes and reducing data read from the thin device to create replicas. Further, in such embodiments, since snapshots are replicated more gradually (e.g., cold regions are replicated more frequently than hotspot regions), when the RPO snapshot interval elapses, mostly hotspot regions should be replicated, since most cold regions were already replicated, thus shortening the time before a new snapshot replication interval begins, leading to increased PIT granularity in the replica journal.

Figure 8:
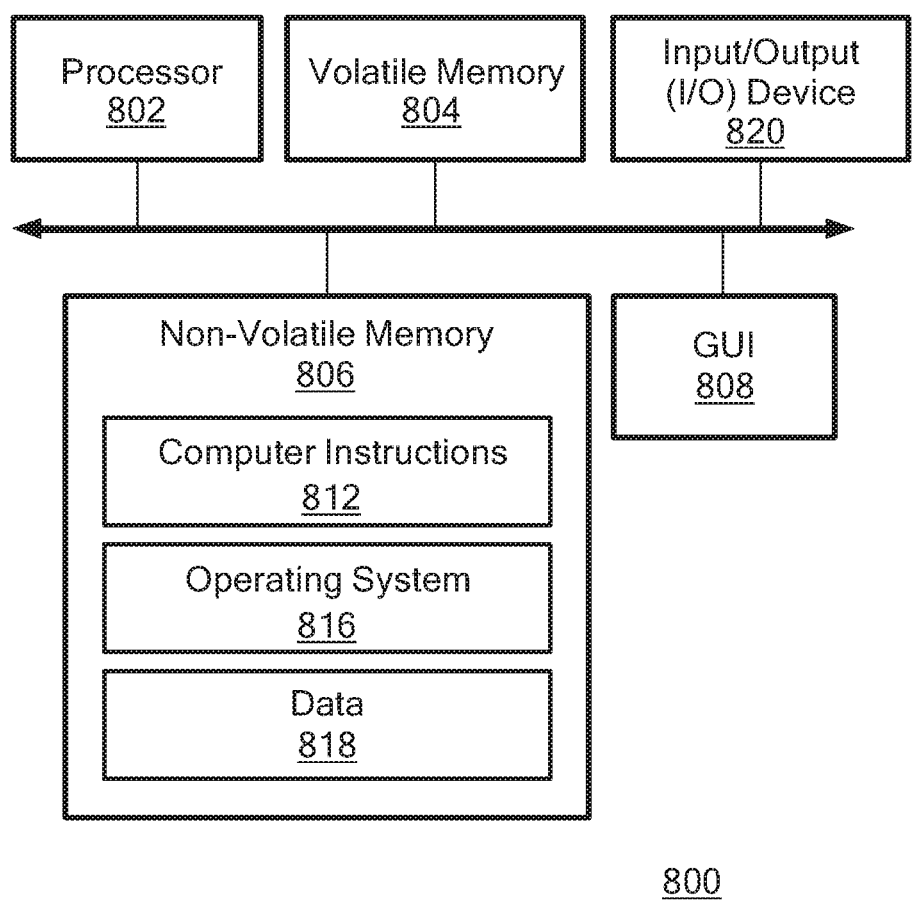
FIG. 8 is a block diagram of an example of a hardware device that may perform at least a portion of the processes in FIGS. 4-6.

In described embodiments, hosts 104 and 116 of FIG. 1 may each correspond to one computer, a plurality of computers, or a network of distributed computers. For example, in some embodiments, host 104 and/or host 116 may be implemented as one or more computers such as shown in FIG. 8. As shown in FIG. 8, computer 800 may include processor 802, volatile memory 804 (e.g., RAM), non-volatile memory 806 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of the processes shown in FIGS. 4-7. Program code may be applied to data entered using an input device of GUI 808 or received from I/O device 820.

Processes 400, 404', 600, and 700 (FIGS. 4-7) are not limited to use with the hardware and software of FIG. 8 and may find applicability in any computing or processing environment and with any type of machine or set of machines that may be capable of running a computer program. The processes described herein may be implemented in hardware, software, or a combination of the two.

The processes described herein are not limited to the specific embodiments described. For example, processes 400, 404', 600, and 700 are not limited to the specific processing order shown in FIGS. 4-7. Rather, any of the blocks of the processes may be re-ordered, combined or removed, performed in parallel or in serial, as necessary, to achieve the results set forth herein.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, a digital signal processor, micro-controller, or general purpose computer. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, one or more general purpose microprocessors, digital signal processors (DSPs), reduced instruction set computers (RISC), complex instruction set computer (CISC), application specific integrated circuits (ASICs), field programmable gate arrays (FPGAs), programmable logic arrays (PLAs), microcontrollers, embedded controllers, multi-core processors, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:
1. A method comprising:
receiving write requests to be written to a production volume of a storage system during an operating time window, each received write request associated with at least one of an identified one or more regions of the production volume;

based upon at least one of the received write requests, identifying one or more regions of the production volume as hotspot regions and one or more regions of the production volume as cold regions;

for write requests associated with a hotspot region, performing snapshot replication at a hotspot region snapshot interval; and for write requests associated with a cold region, performing snapshot replication at one or more cold region snapshot intervals, wherein the hotspot region snapshot interval is longer than the one or more cold region snapshot intervals;

setting the hotspot region snapshot interval based upon a recovery point objective (RPO) setting of the storage system;

setting a first one of the one or more cold region snapshot intervals based upon the hotspot region snapshot interval and at least one of (i) one or more operating conditions of the storage system and (ii) one or more settings of the storage system;

determining at least one of (i) an available bandwidth of a network of the storage system and (ii) at least one bandwidth threshold level setting, the at least one bandwidth threshold level setting associated with a threshold amount of network bandwidth consumed by cold region snapshot replication; and setting a second one of the one or more cold region snapshot intervals based upon the determined at least one of an available bandwidth of a network of the communication system and at least one bandwidth threshold level setting.

2. The method of claim 1, wherein each of the one or more regions comprises one or more contiguous addressable blocks of the production volume.

3. The method of claim 1, further comprising:
determining a size of a thin volume storing write requests for cold regions; and
when the size reaches a threshold amount, generating a cold region snapshot.

4. The method of claim 1, further comprising:
writing snapshot replicas for one or more hotspot regions to a first thin volume of the storage system; and
writing snapshot replicas for one or more cold regions to a second thin volume of the storage system.

5. The method of claim 1, further comprising:
tracking write requests for each of the one or more regions received during at least one previous operating time window;
predicting a number of write requests for each of the one or more regions during a future operating time window, the prediction based upon the tracked write requests received during the at least one previous operating time window,
wherein tracking write requests comprises tracking, for each of the one or more regions, at least one of (i) a number of received write requests and (ii) an amount of data associated with the received write requests;
ranking the one or more regions based upon at least one of the number of received write requests and the amount of data associated with the received write requests;
based upon the ranking, identifying hotspot regions as a first percentage of the one or more regions having at least one of (i) a higher number of received write requests and (ii) a larger amount of data associated with the received write requests; and identifying cold regions as a second percentage of the one or more regions having at least one of (i) a lower number of received write requests and (ii) a smaller amount of data associated with the received write requests.

6. The method of claim 5, wherein predicting a number of write requests for each of the one or more regions during a future operating time window is based upon at least one of: (i) a number of write requests received during one or more previous operating time windows, (ii) an amount of data written to each region in one or more previous operating time windows, (iii) an average of at least one of (i) and (ii) over two or more previous operating time windows, (iv) a time weighted function of at least one of (i) and (ii) over two or more previous operating time windows, and (v) a type of application operating with the storage system.

7. The method of claim 1, further comprising generating a consistent point-in-time (PIT) replica for the production volume by merging a snapshot replica for each hotspot region and one or more snapshot replicas for each cold region.

8. A system comprising:
a processor; and
memory storing computer program code that when executed on the processor causes the processor to operate a storage system, the storage system operable to perform the operations of:
receiving write requests to be written to a production volume of a storage system during an operating time window, each received write request associated with at least one of an identified one or more regions of the production volume;
based upon at least one of the received write requests, identifying one or more regions of the production volume as hotspot regions and one or more regions of the production volume as cold regions;
for write requests associated with a hotspot region, performing snapshot replication at a hotspot region snapshot interval;
for write requests associated with a cold region, performing snapshot replication at one or more cold region snapshot intervals, wherein the hotspot region snapshot interval is longer than the one or more cold region snapshot intervals;
setting the hotspot region snapshot interval based upon a recovery point objective (RPO) setting of the storage system;
setting a first one of the one or more cold region snapshot intervals based upon the hotspot region snapshot interval and at least one of (i) one or more operating conditions of the storage system and (ii) one or more settings of the storage system;
determining at least one of (i) an available bandwidth of a network of the storage system and (ii) at least one bandwidth threshold level setting, the at least one bandwidth threshold level setting associated with a threshold amount of network bandwidth consumed by cold region snapshot replication; and
setting a second one of the one or more cold region snapshot intervals based upon the determined at least one of an available bandwidth of a network of the communication system and at least one bandwidth threshold level setting.

9. The system of claim 8, wherein each of the one or more regions comprises one or more contiguous addressable blocks of the production volume.

10. The system of claim 8, wherein the storage system operable to perform the operations of:
    writing snapshot replicas for one or more hotspot regions to a first thin volume of the storage system; and
    writing snapshot replicas for one or more cold regions to a second thin volume of the storage system.

11. The system of claim 8, wherein the storage system operable to perform the operations of:
    tracking write requests for each of the one or more regions received during a previous operating time window;
    predicting a number of write requests for each of the one or more regions during a future operating time window, the prediction based upon the tracked write requests received during the previous operating time window,
    wherein tracking write requests comprises tracking, for each of the one or more regions, at least one of (i) a number of received write requests and (ii) an amount of data associated with the received write requests;
    ranking the one or more regions based upon at least one of the number of received write requests and the amount of data associated with the received write requests; and
    based upon the ranking, identifying hotspot regions as a first percentage of the one or more regions having at least one of (i) a higher number of received write requests and (ii) a larger amount of data associated with the received write requests; and
    identifying cold regions as a second percentage of the one or more regions having at least one of (i) a lower number of received write requests and (ii) a smaller amount of data associated with the received write requests.

12. A computer program product including a non-transitory computer readable storage medium having computer program code encoded thereon that when executed on a processor of a computer causes the computer to operate a storage system, the computer program product comprising:
    computer program code for receiving write requests to be written to a production volume of a storage system during an operating time window, each received write request associated with at least one of an identified one or more regions of the production volume;
    computer program code for identifying, based upon at least one of the received write requests, one or more regions of the production volume as hotspot regions and one or more regions of the production volume as cold regions;
    for write requests associated with a hotspot region, computer program code for performing snapshot replication at a hotspot region snapshot interval; and
    for write requests associated with a cold region, computer program code for performing snapshot replication at one or more cold region snapshot intervals, wherein the hotspot region snapshot interval is longer than the one or more cold region snapshot intervals;
    setting the hotspot region snapshot interval based upon a recovery point objective (RPO) setting of the storage system;
    setting a first one of the one or more cold region snapshot intervals based upon the hotspot region snapshot interval and at least one of (i) one or more operating conditions of the storage system and (ii) one or more settings of the storage system;
    determining at least one of (i) an available bandwidth of a network of the storage system and (ii) at least one bandwidth threshold level setting, the at least one bandwidth threshold level setting associated with a threshold amount of network bandwidth consumed by cold region snapshot replication; and
    setting a second one of the one or more cold region snapshot intervals based upon the determined at least one of an available bandwidth of a network of the communication system and at least one bandwidth threshold level setting.

13. The computer program product of claim 12, further comprising:
    computer program code for tracking write requests for each of the one or more regions received during a previous operating time window;
    computer program code for predicting a number of write requests for each of the one or more regions during a future operating time window, the prediction based upon the tracked write requests received during the previous operating time window,
    wherein tracking write requests comprises tracking, for each of the one or more regions, at least one of (i) a number of received write requests and (ii) an amount of data associated with the received write requests;
    computer program code for ranking the one or more regions based upon at least one of the number of received write requests and the amount of data associated with the received write requests;
    based upon the ranking, computer program code for identifying hotspot regions as a first percentage of the one or more regions having at least one of (i) a higher number of received write requests and (ii) a larger amount of data associated with the received write requests; and
    computer program code for identifying cold regions as a second percentage of the one or more regions having at least one of (i) a lower number of received write requests and (ii) a smaller amount of data associated with the received write requests.

14. The computer program product of claim 12, further comprising computer program code for generating a consistent point-in-time (PIT) replica for the production volume by merging a snapshot replica for each hotspot region and one or more snapshot replicas for each cold region.

* * * * *